(12) United States Patent
Jackson et al.

(10) Patent No.: US 7,791,585 B2
(45) Date of Patent: Sep. 7, 2010

(54) METHOD OF FABRICATING FLEXIBLE DISPLAY

(75) Inventors: James D. Jackson, Beaverton, OR (US); Terrance J. Dishongh, Hillsboro, OR (US); Damion T. Searls, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 11/561,068

(22) Filed: Nov. 17, 2006

(65) Prior Publication Data

US 2007/0092689 A1     Apr. 26, 2007

Related U.S. Application Data

(62) Division of application No. 09/539,012, filed on Mar. 30, 2000, now Pat. No. 7,158,111.

(51) Int. Cl.
*G09G 3/34*     (2006.01)

(52) U.S. Cl. .......................... 345/107; 359/296; 257/72

(58) Field of Classification Search ................ 345/107, 345/108; 359/296, 290; 264/437, 108, 343; 438/22, 323
See application file for complete search history.

(56) References Cited

U.S. PATENT DOCUMENTS

| | | | |
|---|---|---|---|
| 3,670,323 A | 6/1972 | Sobel et al. | |
| 3,760,505 A | 9/1973 | Clark | |
| 4,139,841 A | 2/1979 | Roberts | |
| 5,411,398 A | 5/1995 | Nakanishi et al. | |
| 5,467,107 A | 11/1995 | DiSanto et al. | |
| 5,469,020 A | 11/1995 | Herrick | |
| 5,659,330 A | 8/1997 | Sheridon | |
| 5,739,887 A | 4/1998 | Ueda et al. | |
| 5,754,329 A | 5/1998 | Coleman | |
| 5,754,332 A | 5/1998 | Crowley | |
| 5,838,400 A | 11/1998 | Ueda et al. | |

(Continued)

FOREIGN PATENT DOCUMENTS

EP     0633488     1/1995

(Continued)

OTHER PUBLICATIONS

*Scientific American* (Cover Illustration). (Nov. 2000), 1 p.

(Continued)

*Primary Examiner*—Kevin M Nguyen
(74) *Attorney, Agent, or Firm*—David L. Guglielmi

(57) ABSTRACT

A method of fabricating a flexible display, the method comprising selecting a first flexible sheet and a second flexible sheet; and forming a number of magnetic display elements having magnetically controllable reflectivity between the first flexible sheet and the second flexible sheet. In some embodiments, a display includes pixels having a magnetically controllable reflectivity. The pixels are formed between a pair of flexible non-conductive sheets. Each of the magnetically controllable pixels includes a flexible ring located between the flexible non-conductive sheets. Each of the magnetically controllable pixels also includes magnetic particles located within the flexible ring. The location of the magnetic particles with respect to the flexible non-conductive sheets determines the reflectivity of the pixel. The display is especially suitable for use in connection with portable electronic devices.

19 Claims, 4 Drawing Sheets

U.S. PATENT DOCUMENTS

| | | | |
|---|---|---|---|
| 5,859,722 A | | 1/1999 | Suga et al. |
| 5,922,268 A * | | 7/1999 | Sheridon ............... 264/437 |
| 5,931,764 A | | 8/1999 | Freeman et al. |
| 5,972,493 A * | | 10/1999 | Iwasaki et al. ............ 428/323 |
| 6,235,395 B1 | | 5/2001 | Sacripante et al. |
| 6,262,706 B1 | | 7/2001 | Albert et al. |
| 6,271,823 B1 | | 8/2001 | Gordon, II et al. |
| 6,281,038 B1 | | 8/2001 | Jacobsen et al. |
| 6,310,675 B1 | | 10/2001 | Yaniv |
| 6,316,278 B1 * | | 11/2001 | Jacobsen et al. ............ 438/22 |
| 6,330,054 B1 | | 12/2001 | Ikami |
| 6,340,965 B1 | | 1/2002 | Howard et al. |
| 6,456,272 B1 * | | 9/2002 | Howard et al. ............ 345/107 |
| 6,498,597 B1 | | 12/2002 | Sawano |
| 6,504,524 B1 | | 1/2003 | Gates et al. |
| 6,518,949 B2 * | | 2/2003 | Drzaic ................ 345/107 |
| 6,629,847 B1 | | 10/2003 | Satoh |
| 6,639,579 B1 | | 10/2003 | Nihira et al. |
| 6,724,519 B1 * | | 4/2004 | Comiskey et al. ........... 359/296 |
| 6,924,781 B1 * | | 8/2005 | Gelbman ................ 345/85 |
| 7,158,111 B1 | | 1/2007 | Jackson et al. |
| 2003/0137717 A1 * | | 7/2003 | Albert et al. ............ 359/296 |

FOREIGN PATENT DOCUMENTS

| | | | |
|---|---|---|---|
| EP | 1269249 A1 | | 1/2003 |
| JP | 07-146659 | | 6/1995 |
| JP | 10-257143 | | 9/1998 |
| WO | WO-90/10291 | | 9/1990 |
| WO | WO-00/13156 A1 | | 3/2000 |
| WO | WO 01/75514 A1 | | 10/2001 |

OTHER PUBLICATIONS

"U.S. Appl. No. 09/539,012, Amended Response filed Jun. 14, 2002 to Non-Final Office Action mailed Mar. 14, 2002", 10 pgs.

"U.S. Appl. No. 09/539,012, Amendment and Response filed Jan. 17, 2006 to Final Office Action mailed Nov. 16, 2005", 21 pgs.

"U.S. Appl. No. 09/539,012, Amendment and Response filed Nov. 20, 2002 to Non-Final Office Action mailed Sep. 10, 2002", 14 pgs.

"U.S. Appl. No. 09/539,012, Amendment and Response filed May 27, 2003 to Non-Final Office Action mailed Mar. 27, 2003", 9 pgs.

"U.S. Appl. No. 09/539,012, Amendment and Response filed Aug. 24, 2005 to Non-Final Office Action mailed Mar. 24, 2005", 11 pgs.

"U.S. Appl. No. 09/539,012, Final Office Action mailed Nov. 16, 2005", 18 pgs.

"U.S. Appl. No. 09/539,012, Non-Final Office Action mailed Mar. 14, 2002", 6 pgs.

"U.S. Appl. No. 09/539,012, Non-Final Office Action mailed Mar. 24, 2005", 14 pgs.

"U.S. Appl. No. 09/539,012, Non-Final Office Action mailed Mar. 27, 2003", 5 pgs.

"U.S. Appl. No. 09/539,012, Non-Final Office Action mailed Mar. 6, 2006", 15 pgs.

"U.S. Appl. No. 09/539,012, Non-Final Office Action mailed Sep. 10, 2002", 7 pgs.

"U.S. Appl. No. 09/539,012, Notice of Allowance mailed Aug. 24, 2006", 6 pgs.

"U.S. Appl. No. 09/539,012, Response filed Jun. 6, 2006 to Non-Final Office Action mailed Mar. 6, 2006", 23 pgs.

"U.S. Appl. No. 09/539,012, Response to Restriction Requirement filed Nov. 18, 2004", 1 pg.

"U.S. Appl. No. 09/539,012, Restriction Requirement mailed Oct. 18, 2004", 4 pgs.

"PCT Application No. PCT/US01/08081, Written Opinion mailed Oct. 28, 2004", 5 pgs.

"PCT Application No. PCT/US01/08081, International Search Report mailed Aug. 31, 2001", 4 pgs.

* cited by examiner

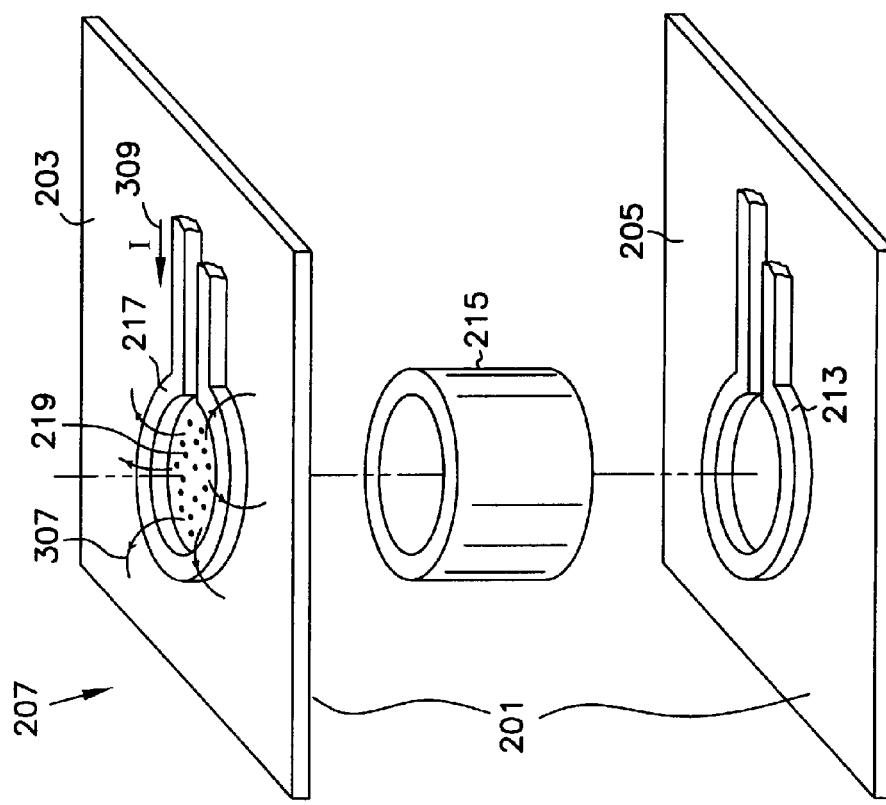
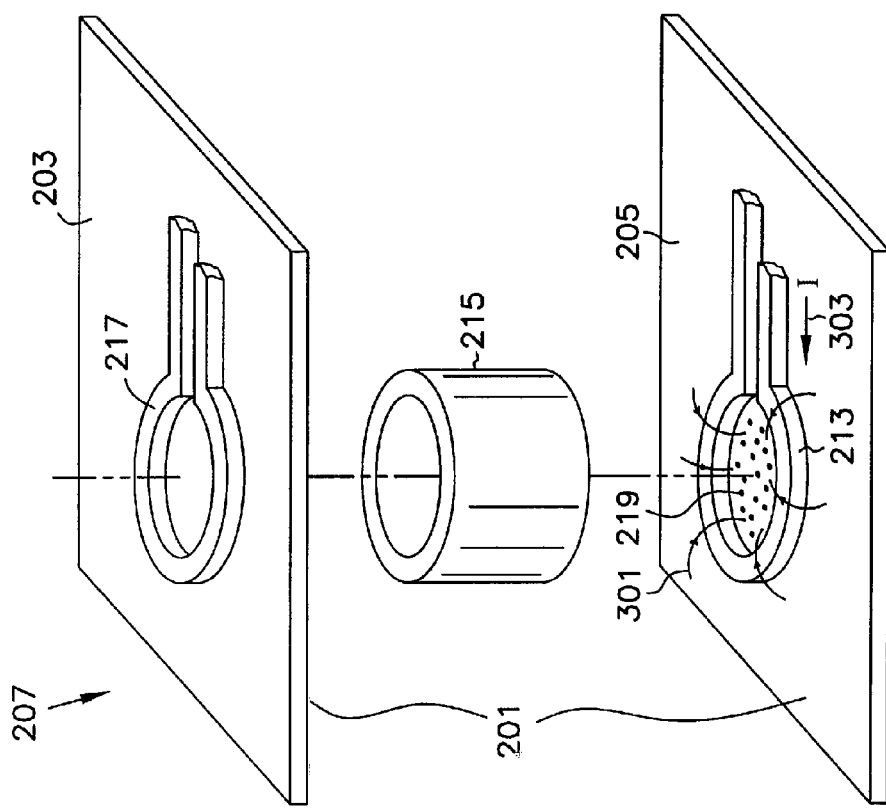

METHOD OF FABRICATING FLEXIBLE DISPLAY

RELATED APPLICATION(S)

The present application is a divisional of U.S. patent application Ser. No. 09/539,012, filed on Mar. 30, 2000, now U.S. Pat. No. 7,158,111 which is incorporated herein by reference.

FIELD

This invention relates to information displays, and more particularly to flexible information displays.

BACKGROUND

Individuals and corporations need information to function and do business in an information driven society. Increasingly, individuals and corporations are expressing a preference for receiving information in real time through portable electronic devices. Examples of portable electronic devices used to receive real time information include cellular telephones, pagers, personal digital assistants, geographical positioning systems, and palm size computers. Generally, these portable electronic devices have a small information display area. For example, a personal digital assistant typically has a flat panel display having an information display area of six or seven square centimeters. Many users of portable electronic devices would prefer a large information display area. Unfortunately, several problems arise when flat panel displays are scaled up and combined with portable electronic devices.

As the display area of a flat panel display is increased, the surface area of the electronic device devoted to the display increases. Since portable electronic devices also include data entry features, such as input keys which utilize some of the surface area of the device, any increase in the surface area of the device devoted to the electronic display decreases the area available for data entry features. Since the trend in portable devices is to include more function in each device, it is undesirable to reduce the data entry features in a particular device in order to increase the area available for the display of information.

A second problem with flat panel displays is that large flat panel displays consume a large amount of power. Increasing the area of the display increases the amount of power required to drive the display. For example, a flat panel display having 1000 pixels requires more power than a flat panel display having 100 pixels. In addition, displays that rely on phosphorescent pixels require extra power to excite the phosphor in the pixels. Providing extra power to a display requires increasing the size of the power supply in the portable electronic device, which increases the size of the portable device. Since portable electronic devices are usually designed to fit in a shirt pocket, any increase in the volume of the devices decreases the portability of the devices.

Therefore, scaling flat panel displays is not a good solution to the problem of increasing the display area of portable electronic devices.

For these and other reasons there is a need for the present invention.

BRIEF DESCRIPTION OF THE DRAWINGS

FIG. 3A is an illustration of example embodiments of an exploded view of a pixel in the off state; and FIG. 3B is an illustration of example embodiments of an exploded view of a pixel in the on state.

DESCRIPTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

A display is described herein which is flexible and includes pixels having a magnetically controllable reflectivity. The pixels are formed between a pair of flexible non-conductive sheets. Each pixel in the display includes a flexible ring that contributes to the flexibility of the display. Each of the pixels also includes magnetic particles whose location within the pixel determines the reflectivity of the pixel. The display, which is described in more detail below, is especially suitable for use in connection with portable electronic devices.

Figure 1:
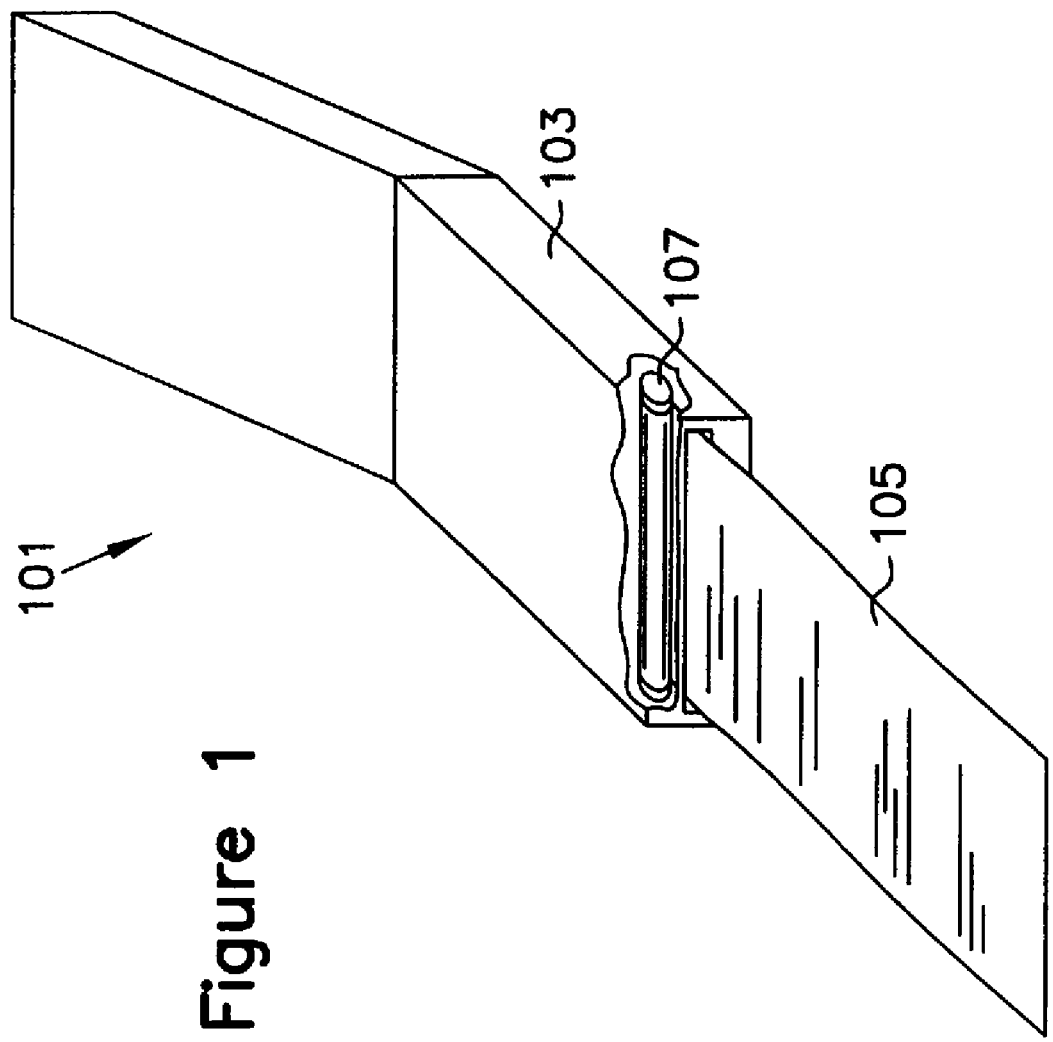
FIG. 1 is an illustration of an example embodiment of a communication device including a flexible display.

FIG. 1 is an illustration of an example embodiment of information processing unit 101 including electronic device 103, display 105, and take-up bar 107. Take-up bar 107 is connected to electronic device 103, and display 105 wraps around take-up bar 107. Display 105 is a flexible display capable of being unrolled from take-up bar 107 for viewing. Display 105 is electrically coupled to electronic device 103 and is capable of receiving information from electronic device 103 for display. In operation, information is provided to display 105 by electronic device 103 and is viewable after display 103 is extended from take-up bar 105. Packaging flexible display 105 on take-up bar 107 permits electronic device 103 to have both a compact housing and a large display area. A large display area is especially useful in connection with devices used to view e-mail.

Electronic device 103 is not limited to a particular type of electronic device. Any device capable of providing information to display device 105 is suitable for use in connection with the present invention. In one embodiment, electronic device 103 is a cellular telephone. In an alternate embodiment, electronic device 103 is a personal digital assistant. In another alternate embodiment, electronic device 103 is a calculator. In still another alternate embodiment, electronic device 103 is a geographical positioning system. In another alternate embodiment, electronic device 103 is a palm size computing device. In yet another alternate embodiment, electronic device 103 is a portable web browser.

Figure 2B:
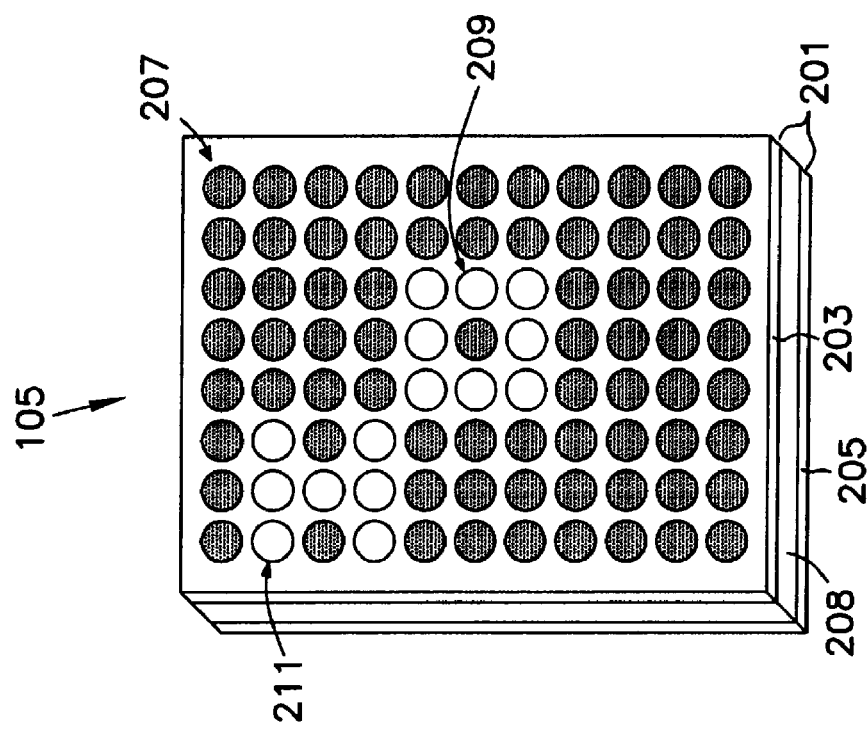
FIG. 2B is an illustration of a back view of an example embodiment of the flexible display shown in FIG. 2A.
Figure 2A:
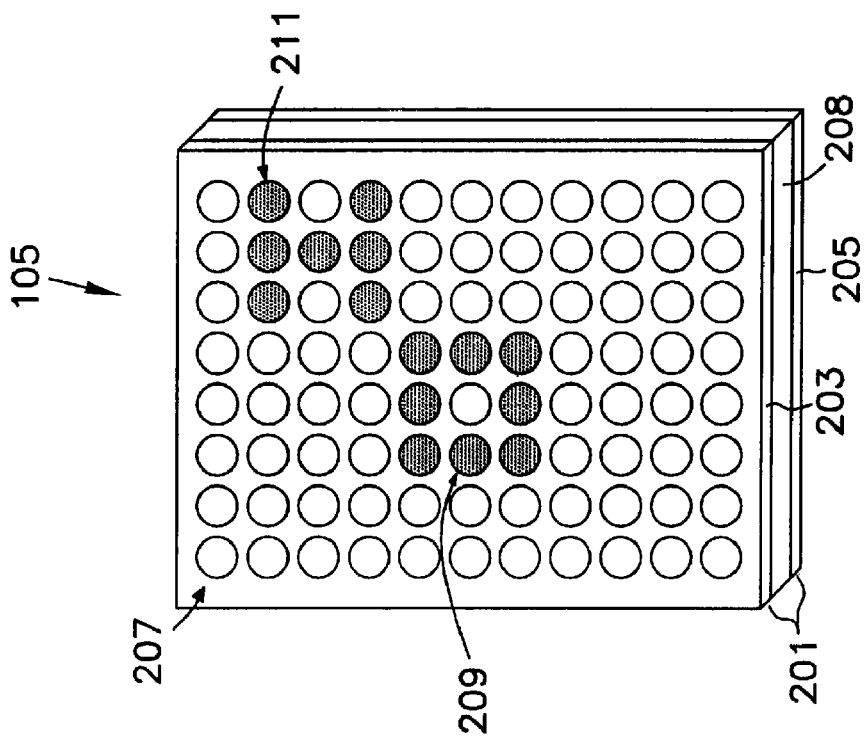
FIG. 2A is an illustration of a front view of an example embodiment of a flexible display.

FIG. 2A is an illustration of a front view of an example embodiment of display 105. Display 105, in one embodiment, includes a pair of flexible sheets 201 comprising first flexible sheet 203 and second flexible sheet 205. Display 105 also includes pixels 207 located in pixel layer 208 between the pair of flexible sheets 201.

Flexible sheets 203 and 205 are preferably fabricated from a flexible dielectric material. For example, in one embodiment, flexible sheets 203 and 205 are fabricated from thin sheets of polyamide. Each one of the pair of flexible sheets 201 has a thickness that allows the pair of flexible sheets 201 to be flexible in a particular application. For example, for a display 105 suitable for use with a hand held device in which flexible sheets 203 and 205 are fabricated from polyamide, the thickness of each of the pair of flexible sheets 201 is between about 25 micrometers and about 125 micrometers. A thickness of less than 25 micrometers may not provide sufficient structure to ensure long lifetime for flexible sheets 203 and 205. A thickness of more than about 125 micrometers may not allow for sufficient flexibility in the pair of flexible sheets 201. At least a portion of one of the pair of dielectric sheets 201 is translucent. A translucent sheet permits displaying information as pixels by reflecting light from a material at the back surface of one of the pair of dielectric sheets 201.

Pixel layer 208, in one embodiment, is fabricated as a single sheet from a flexible material having a number of holes corresponding to the location of pixels 207. The inner surface of each of the number of holes in one embodiment form a cylinder. Alternatively, the inner surface of each of the number of holes form a frustrum. The flexibility of pixel layer 208 is improved by having the inner surface of the number of holes form a frustrum. Pixel layer 208 may be manufactured using an injection molding process. Prior to the molding operation, a mold for a sheet having a number of holes is fabricated. Pixel layer 208 is produced by injecting a material, such as capton, into the mold using an injection molding machine. Fabrication of the present invention is not limited to an injection molding process. Any process capable of producing a flexible pixel layer 208 is also suitable for use in connection with the present invention.

Pixels 207 are arranged in pixel layer 208 between first flexible sheet 203 and second flexible sheet 205 to form an information display area. In one embodiment, pixels 207 are arranged in rows and columns to form a rectangular information display area. A rectangular information display area may be mapped to an array data structure, which simplifies the tracking of the state of the individual pixels in the information display area. In one embodiment, each of the pixels 207 in the information display area, is individually controllable or addressable and may assume an "on" state or an "off" state. In the "off" state, pixels 207 assumes a first image shade. In the "on", state pixels 207 assume a second image shade that differs from, and preferably contrasts with, the first image shade. In one embodiment, the first image shade is white and the second image shade is black.

In operation, pixels 207 are turned "on" and "off" to form images. For example, eight pixels 207 are turned "on" to form square 209 in display 105. In another example, seven pixels 207 are turned "on" to form the letter "I" 211 in display 105.

FIG. 2B is an illustration of a back view of an example embodiment of the flexible display shown in FIG. 2A. In this example embodiment, both first flexible sheet 203 and second flexible sheet 205 are translucent. As can be seen by comparing FIG. 2A with FIG. 2B, for a pair sheets 201 that are both translucent, a negative image of the information displayed in FIG. 2A is displayed in FIG. 2B.

Figure 2C:
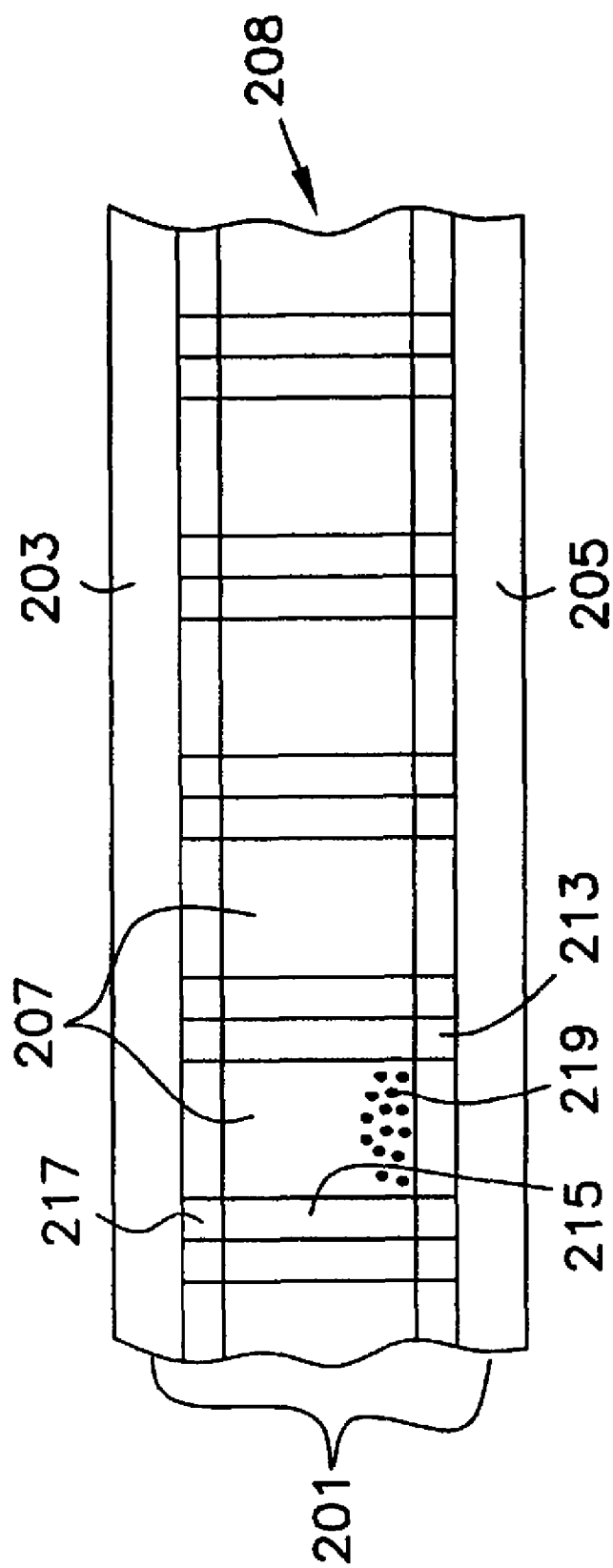
FIG. 2C is a illustration of a side cross-sectional view of an example embodiment of the flexible display shown in FIG. 2A and FIG. 2B.

FIG. 2C is an illustration of a cross-sectional side view of an example embodiment of the flexible display shown in FIG. 2A and FIG. 2B. Pixel layer 208, including pixels 207, is formed between the pair of flexible sheets 201. Each of the pixels 207 includes a conductive trace 213, a non-conductive ring 215, a second conductive trace 217, and magnetic particles 219. Conductive traces 213 and 217 are formed on flexible sheets 203 and 205. Non-conductive ring 215 fits between flexible sheets 203 and 205 and is aligned with conductive traces 213 and 217. Non-conductive ring 215, in cooperation with flexible sheets 203 and 205, encapsulates magnetic particles 219, and forms a flexible display 105.

Conductive traces 213 and 217 are fabricated from conductive materials such as copper, aluminum, silver or gold or alloys of copper, aluminum, silver or gold. To fabricate conductive traces 213 and 217 a layer of conductive material is formed on the surface of flexible sheets 203 and 205. The conductive material is patterned and etched to leave conductive traces 213 and 217. The shape of conductive traces 213 and 217 are selected for ease of fabrication and packing density. In one embodiment, traces 213 and 217 have a circular shape. A circular shape is easily fabricated, and the corresponding non-conductive ring 215 which preferably matches the shape of traces 213 and 217 is also easily fabricated as a circular cylinder. In an alternate embodiment, conductive traces 213 and 217 have a hexagonal shape. Conductive traces 213 and 217 have a cross-sectional area sufficient to support a current, without excessive heating, that produces a magnetic field capable of forcing magnetic particles 219 away from the surface on which the conductive trace is formed.

Non-conductive ring 215 separates flexible sheet 201 from flexible sheet 203 and encloses magnetic particles 219. The flexibility of non-conductive ring 215 affects the flexibility of flexible sheet 203, so non-conductive ring 215 is preferably fabricated from a flexible material. In one embodiment, non-conductive ring 215 is fabricated from capton. The height of non-conductive ring 215 is selected to allow for contrast between an "on" state and an "off" state in pixels 207. The wall thickness of non-conductive ring 215 is selected to provided structural integrity for the projected life of the flexible display. In fabricating flexible sheet 203, non-conductive ring 215 is generally aligned with conductive traces 213 and 217, and preferably, the centerline of non-conductive ring 215 is aligned with the centerline of conductive traces 213 and 217.

Magnetic particles 219 provide a medium for changing the state of pixels 207 by reflecting light from the back surface of first flexible sheet 203 for a pixel in the "on" state. Therefore, magnetic particles 219 are preferably fabricated from a reflective material. Magnetic particles 219 are also capable of responding to a magnetic field, so magnetic particles 219 are fabricated from a magnetic material. In one embodiment, magnetic particles 219 are fabricated from iron. Magnetic particles 219, in one embodiment are iron shavings. In an alternate embodiment, magnetic particles 219 are powdered iron. To turn pixels 207 "on" magnetic particles 219 are forced to the back surface of flexible sheet 203. To turn pixels 207 "off" magnetic particles 219 are forced to the back surface of flexible sheet 205.

FIGS. 3A and 3B are illustrations of example embodiments of an exploded view of pixel 207 in the "off" state and the "on" state, respectively. Pixel 207 includes conductive traces 213 and 217 formed on the pair of flexible sheets 201. Non-conductive ring 215 is located between the pair of flexible sheets 201. Magnetic particles 219 are enclosed between non-conductive ring 215 and the pair of sheets 201. FIG. 3A also shows magnetic field lines 301 for current 303 flowing in conductive trace 213. The magnetic filed associated with magnetic field lines 301 pin magnetic particles 219 at the inner surface of flexible sheet 205. For magnetic particles 219 pinned at the inner surface of flexible sheet 205, light entering pixel 207 at flexible sheet 203 is not reflected from the back surface of flexible sheet 203 and pixel 207 appears dark. FIG. 3B shows magnetic field lines 307 for current 309 in conductive trace 217. The magnetic field associated with magnetic field lines 307 pin magnetic particles 219 at the inner surface of flexible sheet 203. For magnetic particles 219 pinned at the inner surface of flexible sheet 203 light entering pixel 207 at flexible sheet 203 is reflected from the back surface of flexible sheet 203 and pixel 207 appears light.

A display and a method of fabricating a display has been described herein. In one embodiment, the display includes a pair of flexible sheets and a number of pixels located between the flexible sheets. The number of pixels have a reflectivity that is magnetically controllable. In one embodiment, a method for fabricating the display includes forming a number of pixels by fabricating traces, an insulating ring, and magnetic particles between a pair of flexible non-conductive sheets.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What claimed is:

1. A method of fabricating a flexible display, the method comprising:
    selecting a first flexible sheet and a second flexible sheet; and
    forming a number of magnetic display elements having magnetically controllable reflectivity between the first flexible sheet and the second flexible sheet, wherein forming a number of magnet display elements between the first flexible sheet and the second flexible sheet comprises:
    forming a first conductive trace on the first flexible sheet;
    forming a second conductive trace on the second flexible sheet;
    inserting a non-conductive element between the first conductive trace and the second conductive trace; and
    placing a number of magnetic particles in the non-conductive element.

2. The method of claim 1, wherein selecting a first flexible sheet and a second flexible sheet comprises fabricating at least one of the first or second flexible sheets from a dielectric material.

3. The method of claim 1, wherein forming a first conductive trace includes:
    forming a conductive material on a surface of the first flexible sheet;
    patterning the conductive material; and
    etching the conductive material to leave the first conductive trace.

4. The method of claim 1, wherein the first conductive trace and the second conductive trace include copper.

5. The method of claim 1, wherein selecting a first flexible sheet and a second flexible sheet includes fabricating sheets of polyamide.

6. The method of claim 1, wherein selecting a first flexible sheet and a second flexible sheet includes selecting a sheet having a thickness between about 25 micrometers and about 125 micrometers.

7. The method of claim 1, wherein forming a number of magnetic display elements includes forming pixels arranged in rows and columns to form a rectangular display area.

8. A method comprising:
    providing a single flexible sheet having a plurality of holes, each of the plurality of holes corresponding to a location of a pixel in a flexible display;
    providing a plurality of magnetic particles in each of the plurality of holes corresponding to a location of a pixel; and
    arranging the single flexible sheet between a first flexible sheet and a second flexible sheet to form an information display area, further comprising:
    forming a first conductive trace on the first flexible sheet;
    forming a second conductive trace on the second flexible sheet;
    inserting a non-conductive element between the first conductive trace and the second conductive trace; and
    placing a number of magnetic particles in the non-conductive element.

9. The method of claim 8, wherein an inner surface of each of the plurality of holes forms a cylinder.

10. The method of claim 8, wherein the first flexible sheet and the second flexible sheet includes a sheet of polyamide.

11. The method of claim 8, wherein providing a single flexible sheet includes injecting capton into a mold.

12. The method of claim 8, wherein arranging the single flexible sheet between a first flexible sheet and a second flexible sheet includes at least a portion of one of the first flexible sheet and the second sheet is a translucent sheet.

13. The method of claim 8, wherein arranging the single flexible sheet between a first flexible sheet and a second flexible sheet includes for each of the plurality of holes providing a first conductive trace on a surface of the first flexible sheet, and providing a second conductive trace on a surface of the second flexible sheet.

14. The method of claim 13, wherein providing the first conductive trace and the second conductive trace for each of the plurality of holes includes the first conductive trace and the second conductive trace having a centerline aligned with a centerline of one of the plurality of holes.

15. A method comprising:
    providing an electronic device;
    providing a take-up bar connected to the electronic device; and
    providing a flexible display communicatively coupled to the electronic device and operable to wrap around the take-up bar, wherein providing the flexible display includes providing a first flexible sheet and a second flexible sheet and forming a number of magnetic display elements having magnetically controllable reflectivity between the first flexible sheet and the second flexible sheet, wherein forming a number of magnet display elements between the first flexible sheet and the second flexible sheet comprises:
    forming a first conductive trace on the first flexible sheet;
    forming a second conductive trace on the second flexible sheet;
    inserting a non-conductive element between the first conductive trace and the second conductive trace; and
    placing a number of magnetic particles in the non-conductive element.

16. The method of claim 15, wherein providing an electronic device includes:
    providing a cellular telephone.

17. The method of claim 15, wherein providing an electronic device includes:
    providing a portable web browser.

18. The method of claim 15, wherein providing an electronic device includes:
    providing a geographical positioning system.

19. The method of claim 15, wherein providing a flexible display communicatively coupled to the electronic device includes:
    the flexible display electrically coupled to the electronic device and operable to receive information from the electronic device for display on the flexible display.

* * * * *